United States Patent [19]

Brown et al.

[11] 4,070,214
[45] Jan. 24, 1978

[54] PROCESS FOR CONTINUOUS PRECISION LAMINATION OF MULTIPLE STRIPS TO A SUBSTRATE

[75] Inventors: Jordon M. Brown, Somerset; Charles J. Benedict, Newark; Robert M. Pricone, West Milford, all of N.J.

[73] Assignee: Sun Chemical Corporation, New York, N.Y.

[21] Appl. No.: 752,068

[22] Filed: Dec. 20, 1976

[51] Int. Cl.² .................... H01B 7/08; H01B 13/00
[52] U.S. Cl. ................................ 156/47; 156/178; 156/193; 156/256; 156/324; 174/117 FF; 226/3
[58] Field of Search ............... 156/47, 191, 259–494, 156/554, 178, 256; 174/117 F, 117 FF, 117 A; 226/3, 189, 191; 339/17 F; 242/75.43

[56] References Cited

U.S. PATENT DOCUMENTS

| 1,837,223 | 12/1931 | Kohlmeier | 226/189 X |
| 3,168,617 | 2/1965 | Richter | 156/47 |
| 3,268,846 | 8/1966 | Morey | 174/117 FF |
| 3,505,144 | 4/1970 | Kilduff et al. | 156/259 |
| 3,728,199 | 4/1973 | Stanley | 156/554 |
| 3,941,637 | 3/1976 | Masuda et al. | 156/494 X |
| 4,000,865 | 1/1977 | Gaskins | 242/75.43 |

Primary Examiner—William A. Powell
Assistant Examiner—M. G. Wityshyn
Attorney, Agent, or Firm—Cynthia Berlow

[57] ABSTRACT

Multiple strips of foil are continuously and precisely laminated to a substrate by a process which comprises the following steps: (1) coating rolls of foil on one side with an adhesive, (2) slitting the adhesive-coated foil to the desired width(s), (3) mounting the slit rolls onto an unwind shaft, (4) pulling each foil strip through a first guiding spool fixed on a rigid shaft, (5) pulling each foil strip through a second spool mounted on a shaft, (6) placing the foil strips onto the substrate, and (7) handling the resulting laminate product by any known and convenient method.

4 Claims, 2 Drawing Figures

PROCESS FOR CONTINUOUS PRECISION LAMINATION OF MULTIPLE STRIPS TO A SUBSTRATE

This invention relates to electrical shielding and insulating materials. More specifically it relates to a process for the continuous precision lamination of multiple strips of foil to a substrate.

Composites of strips of conductive foil on a continuous dielectric carrier web wherein the strips are laid in parallel spaced positions and bonded to the substrate are known. Such products are used in a variety of shielding and non-shielding applications and are particularly suited to be used with stick-wound transformer coils.

Although it is recognized that there are advantages to applying shielding to a number of coils in a single operation, no method was known for making a shielding that comprised precisely and reproducibly spaced parallel strips onto a substrate with the widths of the strips and the spaces between them readily variable as required by each customer's specifications. In the first place, it was not possible to place the strips and consistently hold the required tolerances. Furthermore, in order to apply the insulation and the shielding, the winding machines had to be stopped, resulting in considerable downtime. Also it was difficult to shift quickly from one width strip or space between strips to another.

In accordance with the instant invention there is provided a laminate wherein strips of foil or foil/film composite are precision guided and laminated continuously to a substrate.

The invention will be more fully understood from the following description of the accompanying drawings, in which.

Figure 1:
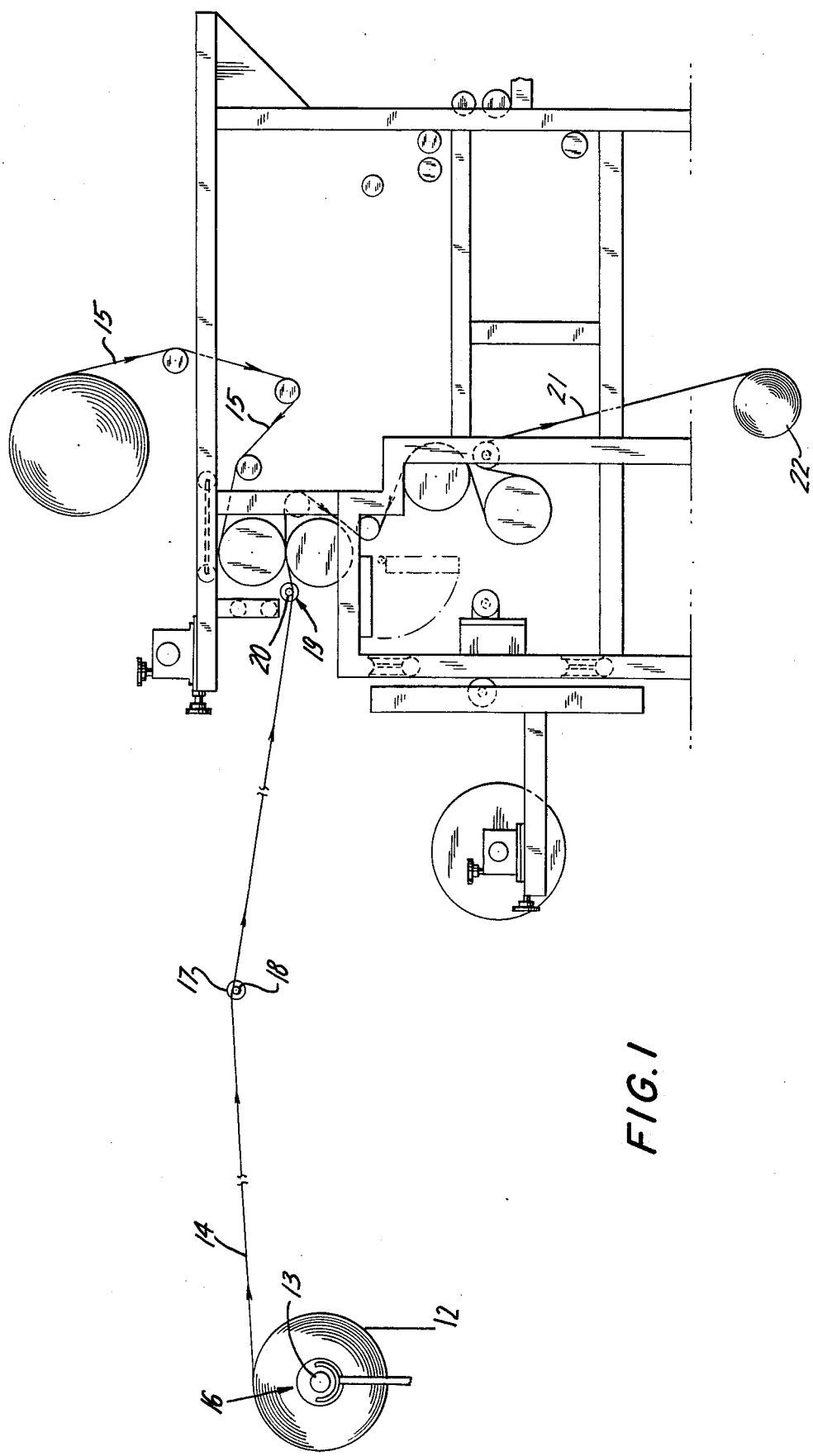
FIG. 1 is an overall drawing of typical apparatus used for the process of this invention.
Figure 2:
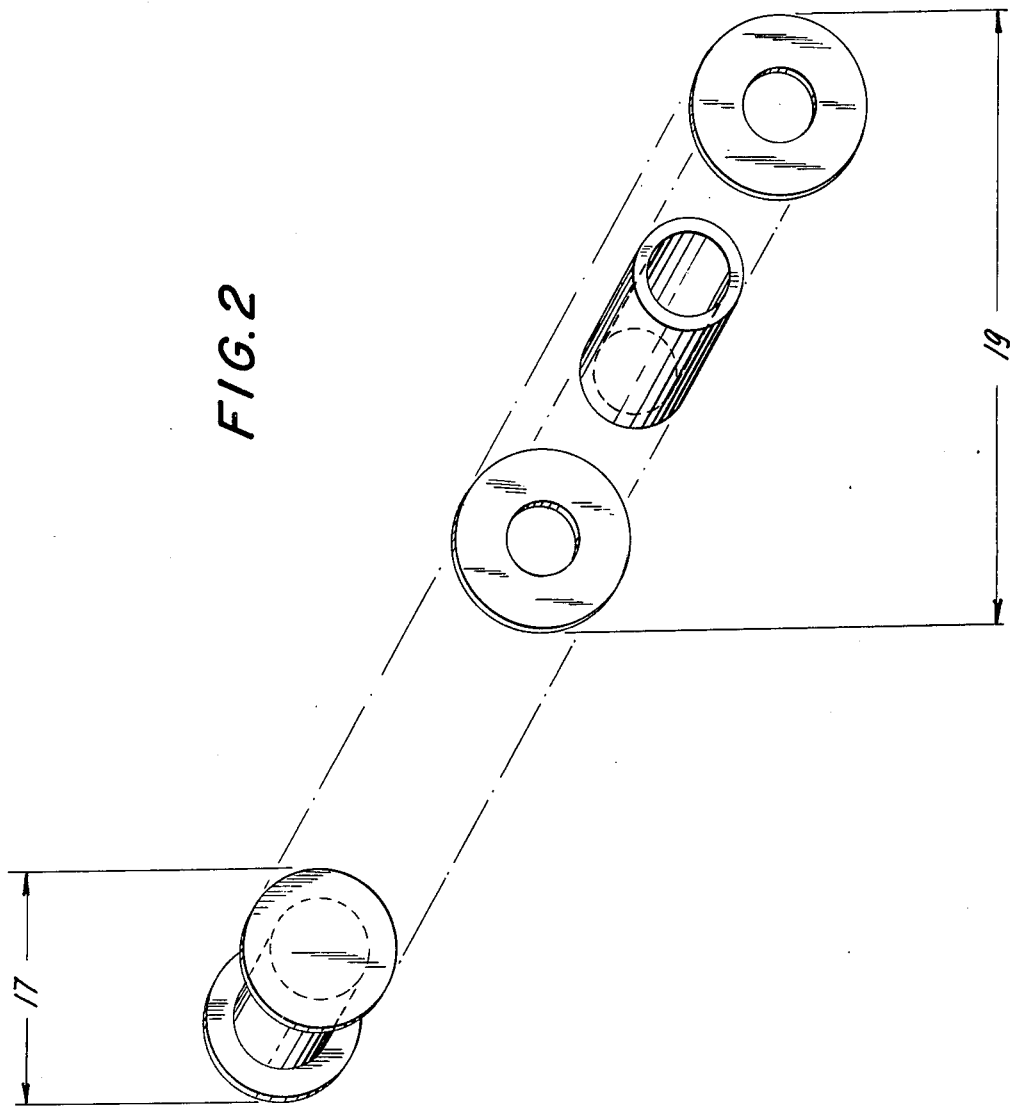
FIG. 2 is an enlarged drawing of the guider spools.

Now referring to the figures, FIG. 1 illustrates the general guider/laminator assembly and FIG. 2 shows the details of the guider spools, as described below.

Laminates are made by the process of this invention which comprises the steps of (1) coating a roll of foil on one side with any suitable non-blocking heat-activated or thermosetting adhesive and in any convenient manner, (2) slitting the adhesive-coated roll of foil to the desired width(s) by any conventional technique, (3) mounting the slit roll 12 on an unwind shaft 13 at a distance of at least about 7 feet from the point where the foil strip 14 will be laminated to the substrate 15, there being a pneumatic brake device 16 to adjust the unwind tension; (4) pulling each foil strip 14 through a first guiding spool 17 fixed on a rigid shaft 18 perpendicular to the direction of the foil strip and midway between the unwind shaft and the point of lamination, the spools being cut about 0.015 inch wider than the foil strip and serving as a rough guide; (5) pulling each foil strip through a second guiding spool 19 mounted on a threaded shaft 20 perpendicular to the direction of the foil strip and less than about 3 inches from the point of lamination, the spools being machined to about 0.005–0.01 inch wider than the foil strip and serving as a fine guide; these spools are of a three-piece design so tat they can be adjusted to compensate for shrinkage of the base substrate 15; (6) placing the foil strips onto the substrate in any known manner; and (7) removing the resulting laminate product by any desired technique, for example by winding onto roll 22.

With further regard to the compensation procedure, the three-piece spools 19 are mounted on a threaded shaft 20 and are positioned to the desired tolerance by measuring the width of the gaps between the spools; for most precise alignment, the shaft will have 64 threads per inch, although this number is not required for the process of the invention. If the substrate should shrink after being heated at the point at lamination, the positions of the strips and the gaps will be reduced accordingly. For example, in a design of 25 equal width strips a web shrinkage of 0.1875 inch would reduce each gap 0.0075 inch. To compensate for this 0.0075 inch reduction, since one full turn of the spool equals 0.0156 inch, each spool except for the first is moved out one-half turn.

By varying the sizes of the spools and the spaces between them, patterns of the foil strips may be changed quickly, while retaining the required tolerances.

The conductive foil strips 14 may be aluminum, copper, steel, or any other suitable metal or non-metal that has been rendered electrically conducting by methods known in the art, as well as composites of these with, for example, a film of polyolefin or polyester. The strips may vary in thickness from 0.00035 to 0.015 inch and in width upward from 0.5 inch to any desired width.

The gaps between the strips and at the edges are at least 0.25 inch and may range up to several inches.

The insulation substrate 15 may be a foil, film, or sheet of polyolefin, polyester, paper, or the like, and combinations of these. The substrate may vary in thickness from 0.0005 to 0.02 inch and in width upward from 0.75 to about 30 inches, depending on the overall width of the machine.

The process of this invention results in precision in the guiding and placing of the foil strips onto the dielectric carrier web, a tolerance of 0.015 inch between the adjacent strips and between the strips at both ends of the web, regardless of the number of strips, being achieved.

By the process of this invention many foil strips can be bonded simultaneously, continuously, and precisely in any desired width or combination of widths of strips and spaces to one or both sides of a selected substrate. It is also within the scope of this invention to place and bond simultaneously strips of different materials onto the substrate.

The products of the process of this invention are useful in a variety of shielding and non-shielding applications, such as strip conductors, flat cables, and stick-wound transformer coils.

It is of particular value in shielding transformer coils where the product provides multiple shielding of stick-wound coils in a single wrapping operation, offering many advantages to transformer manufacturers who previously had to utilize the single strip hand taping method of shielding. Included in these advantages are increased productivity, precise shield-to-coil alignments across the length of the stick, margined edges which isolate each shield and help to prevent shorting, and a dielectric carrier web which reduces or eliminates the need for other layer insulation.

Although there have been described preferred embodiments of this novel invention, many variations and modifications will now be apparent to those skilled in the art. This invention, therefore, is to be limited not by the specific disclosure herein, but only by the appended claims.

What is claimed is:

1. A process for continuously and precisely laminating strips of foil to a substrate which comprises the steps of (1) coating a roll of foil with an adhesive; (2) slitting the adhesive-coated roll of foil to the desired width or widths; (3) mounting the slit roll of foil onto an unwind shaft at a distance of at least about 7 feet from the point of lamination, said unwind shaft being fitted with a pneumatic brake device to adjust the unwind tension; (4) pulling each foil strip through a first guiding spool fixed on a rigid shaft perpendicular to the direction of the foil strip and midway between the unwind shaft and the point of lamination, each said first spool being about 0.015 inch wider than the foil strip and serving as a rough guide; (5) pulling each foil strip through a second guiding spool mounted on a threaded shaft perpendicular to the direction of the foil strip and less than about 3 inches from the point of lamination, each said second spool being about 0.005–0.01 inch wider than the foil strip, serving as a fine guide and being of a three-piece design to enable it to be adjusted; (6) placing the precisely positioned foil strips onto a substrate; and (7) removing the resulting laminate product.

2. The process of claim 1 wherein the foil is a conductive material.

3. The process of claim 1 wherein the shaft on which the second guiding spools are mounted has 64 threads per inch.

4. The process of claim 1 wherein the substrate is an insulating material.

* * * * *